(12) United States Patent
Buckland et al.

(10) Patent No.: US 12,292,558 B2
(45) Date of Patent: May 6, 2025

(54) DUAL-MODE OPTICAL COHERENCE TOMOGRAPHY AND OPTICAL COHERENCE MICROSCOPY IMAGING SYSTEMS AND METHODS

(71) Applicant: LighTopTech Corp., West Henrietta, NY (US)

(72) Inventors: Eric L. Buckland, Hickory, NC (US); Cristina Canavesi, West Henrietta, NY (US)

(73) Assignee: LighTopTech Corp., West Henrietta, NY (US)

( * ) Notice: Subject to any disclaimer, the term of this patent is extended or adjusted under 35 U.S.C. 154(b) by 852 days.

(21) Appl. No.: 17/397,557

(22) Filed: Aug. 9, 2021

(65) Prior Publication Data
US 2022/0326495 A1 Oct. 13, 2022

Related U.S. Application Data

(60) Provisional application No. 63/172,385, filed on Apr. 8, 2021.

(51) Int. Cl.
| | |
|---|---|
| *G02B 21/00* | (2006.01) |
| *G01B 9/02091* | (2022.01) |
| *G02B 7/14* | (2021.01) |
| *G02B 7/16* | (2021.01) |
| *G02B 21/36* | (2006.01) |

(52) U.S. Cl.
CPC ..... *G02B 21/0056* (2013.01); *G01B 9/02091* (2013.01); *G02B 7/14* (2013.01); *G02B 7/16* (2013.01); *G02B 21/361* (2013.01)

(58) Field of Classification Search
None
See application file for complete search history.

(56) References Cited

U.S. PATENT DOCUMENTS

| | | | | |
|---|---|---|---|---|
| 7,602,501 | B2 * | 10/2009 | Ralston | G02B 27/58 356/497 |
| 8,184,365 | B2 | 5/2012 | Rolland et al. | |
| 8,184,367 | B2 | 5/2012 | Rolland et al. | |
| 8,340,455 | B2 | 12/2012 | Rolland et al. | |
| 2008/0304144 | A1 * | 12/2008 | Reimer | A61B 90/36 359/377 |
| 2020/0367744 | A1 * | 11/2020 | Duchon | A61B 3/102 |

* cited by examiner

*Primary Examiner* — Derek S. Chapel
(74) *Attorney, Agent, or Firm* — Jodi A. Reynolds, Esq.; Harter Secrest & Emery LLP

(57) ABSTRACT

A low-coherence interferometry imaging system for imaging translucent samples, wherein the system includes an optical coherence microscopy (OCM) mode and an optical coherence tomography (OCT) mode, and wherein the system can selectively employ either mode without requiring re-positioning of a sample under test. The system provides for the selective disposition of the OCM mode or the OCT mode in an optical path intermediate a scanning system and an imaging objective.

20 Claims, 19 Drawing Sheets

DUAL-MODE OPTICAL COHERENCE TOMOGRAPHY AND OPTICAL COHERENCE MICROSCOPY IMAGING SYSTEMS AND METHODS

CROSS-REFERENCE TO RELATED APPLICATIONS

The present application claims the benefit of U.S. provisional patent application 63/172,385 filed Apr. 8, 2021, and which disclosure is hereby expressly incorporated by reference.

STATEMENT REGARDING FEDERALLY SPONSORED RESEARCH OR DEVELOPMENT

This invention was made with government support under grant EY028827 awarded by the National Institutes of Health (NIH). The government has certain rights in the invention.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure relates to the imaging of translucent objects, including biological tissue, and particularly to a low-coherence interferometry (LCI) imaging system for imaging translucent objects and more particularly to an imaging system having a first mode, such as an Optical Coherence Microscopy (OCM) mode, providing a relatively high numerical aperture interferometric imaging that provides a relatively high lateral resolution depth-resolved images of the translucent object, and a second mode, such as an Optical Coherence Tomography (OCT) mode, providing a relatively low numerical aperture interferometric imaging system that provides relatively high depth of field depth-resolved images of the translucent objects. That is, in the OCM mode the lateral resolution depth-resolved images of the translucent object is greater than in the OCT mode and the depth of field depth-resolved images of the translucent objects is less than in the OCT mode. Conversely, in the OCT mode the lateral resolution depth-resolved images of the translucent object is less than in the OCM mode and the depth of field depth-resolved images of the translucent objects is more than in the OCM mode.

Description of the Related Art

Optical coherence tomography (OCT) is a low numerical aperture interferometric imaging system that provides depth-resolved images of translucent objects, including biological tissue, generally with the intent of maximizing imaging depth. Optical coherence microscopy (OCM) is, in contrast, a high numerical aperture interferometric imaging system that provides depth-resolved images of translucent objects, including biological tissue with the intent of maximizing lateral resolution. OCT is generally useful for non-isotropic depth-resolved imaging of layered-media, whereas OCM is provides isotropic imaging to visualize media at high lateral resolution, for example with cellular resolution. These optical systems have distinctly different imaging optics and have not previously been combined within a single imaging system.

Traditionally OCT and OCM systems are distinct. Both OCT and OCM are scanning implementations of low-coherence interferometry (LCI) imaging systems. LCI imaging systems, including OCT and OCM are well-established imaging methods to provide either high axial, or longitudinal, resolution of an imaged object along the trajectory of a scanned optical beam.

Therefore, the need exists for an imaging system that can provide the benefits of both OCM and OCT systems without requiring separate systems. The need further exists to minimize image distortions between OCM imaging and OCT imaging.

Further, in any particular subject under test, a region of interest for high lateral resolution imaging may be a specific structure or layer that is embedded within a larger volume. Therefore, the need also exists for an imaging system that can obtain a fast survey image of the larger volume with a high depth of field scan, identify the bounds of the region of interest from the survey image, and guide the acquisition of a second image with a higher lateral resolution of the region of interest.

BRIEF SUMMARY OF THE INVENTION

Generally, the present disclosure provides an optical assembly having a scanning system configured to scan a sample with an illuminating beam; an imaging objective; and an afocal relay optically intermediate the scanning system and the imaging objective, the afocal relay configurable between a first (OCM) mode having a first magnification, a first field of view and a first lateral resolution, a first physical path length and a second mode (OCT) having a lower second magnification, a larger second field of view, a second physical path length and a lower second lateral resolution; wherein the first physical path length and the second physical path lengths are equal.

The present disclosure also provides an optical assembly having a scanning system configured to scan a sample under test with an illuminating beam; an imaging objective; and an afocal relay optically intermediate the scanning system and the imaging objective, the afocal relay comprising an entrance pupil located to receive the illumination beam and an exit pupil located substantially at a back focal plane of the imaging objective, the afocal relay configurable between a first (OCT) mode having a first magnification, a first field of view, a first lateral resolution, and a first physical path length and a second (OCM) mode having a higher second magnification, a smaller second field of view, a higher second lateral resolution, and a second physical path length; wherein the afocal relay when configured in the first and second modes maintains a constant fixed physical location for each of the entrance pupil and exit pupil in the first mode and the second mode of the afocal relay. That is, the afocal relay is configured to maintain (i) the entrance pupil in a first fixed physical location in both the first mode and the second mode of the afocal relay and (ii) the exit pupil in a second fixed physical location in both the first mode and the second mode of the afocal relay.

In a further configuration, the present disclosure provides an optical assembly having a scanning system configured to scan a sample with an illuminating beam; an imaging objective; and an afocal relay optically intermediate the scanning system and the imaging objective, the afocal relay configurable between a first (OCM) mode having a first magnification, a first field of view and a first lateral resolution, a first physical path length and a second mode (OCT) having a lower second magnification, a larger second field of view, a second physical path length and a lower second lateral resolution; wherein the first mode and the second mode are telecentric.

In still a further configuration, the present disclosure provides an optical assembly having a scanning system comprising a 2-axis scanning mirror located at an entrance pupil to a configurable afocal relay and configured to scan a sample with an illuminating beam; and an imaging objective positioned distal to an exit pupil of the afocal relay such that the exit pupil of the afocal relay is coincident with the entrance pupil of the imaging objective; wherein the afocal relay in a first configuration magnifies the illuminating beam emergent from the entrance pupil; wherein the afocal relay in a second configuration demagnifies the illuminating beam emergent from the entrance pupil; wherein the physical positions of the entrance and exit pupil of the afocal relays are held constant in the first and second configurations; and wherein the first configuration provides for an OCM scanning mode with a first (relatively high) numerical aperture and the second configuration provides for an OCT scanning mode with a second lower numerical aperture.

The present disclosure further provides a system configured to acquire a first survey image of a subject under test in the low numerical aperture, high depth of field, OCT mode. The survey image is processed using image processing techniques known in the art as specifically applied to identify the surface in the survey image, including but not limited to surface segmentation or layer segmentation to segment or otherwise identify a localized region of interest within the survey volume. Quantitative information derived from the location of the identified region of interest is fed back into a control system to define the region for the OCM mode acquisition, wherein an OCM image of the region of interest (target volume) is acquired.

The respective OCM and OCT optics being telecentric, and the system maintaining telecentricity in each operational mode, thus reduces image distortions.

The disclosure provides a method including imaging a sample under test with an illumination beam passing through an afocal relay in a first mode, the afocal relay having a first numerical aperture in the first mode; disposing the afocal relay in a second mode having a second numerical aperture, the second numerical being different from the first numerical aperture; and imaging the sample under test with an illumination beam passing through the afocal relay in the second mode.

An alternative method is provided including obtaining a first image of an extended region of a sample under test with an afocal relay in a first mode having a first numerical aperture, a first lateral resolution, and a first depth of field; identifying, in the first image, a region of interest within the extended region; and obtaining a second image of the region of interest with the afocal relay in a second mode having a second numerical aperture greater than the first numerical aperture and a second lateral resolution greater than the first lateral resolution.

A further apparatus for imaging a sample under test is disclosed including a light source generating a light beam split between a reference arm and a sample arm; a scanning system configured to scan a sample under test with an illuminating beam in the sample arm; an imaging objective; an afocal relay optically intermediate the scanning system and the imaging objective, the afocal relay configurable between a first (OCT) mode having a first magnification, a first field of view, a first lateral resolution, and a first physical path length and a second (OCM) mode having a higher second magnification, a smaller second field of view, a higher second lateral resolution, and a second physical path length; and a controller operably connected to at least one of the afocal relay, the reference arm, and the sample arm and configured to identify a set of calibration parameters corresponding at least one of a scan angle, a reference arm path length, and a focus of at least one of the first mode and the second mode.

An additional disclosed method includes acquiring a first image of an extended region of the sample under test with a configurable afocal relay having a first mode with a first numerical aperture and a second mode having a second numerical aperture, the first numerical aperture being less than the second numerical aperture, the first image acquired in the first mode of afocal relay; identifying a region of interest in the extended region; and acquiring a second image of the region of interest with the afocal relay in the second mode corresponding to a calibration of at least one a scan angle, a reference arm path length, and a focus of at least one of the first mode and the second mode.

A further method of imaging a sample under test provides scanning an extended region of the sample under test with an illumination beam passing through an afocal relay in a first mode having a first numerical aperture and a first path length to generate a first image; identifying a region of interest in the extended region based on the first image; and scanning the region of interest with an illumination beam passing through the afocal relay in a second mode to generate a second image, the second mode having a second numerical aperture and a second path length, wherein the second numerical aperture is greater than the first numerical aperture, wherein the imaging can be calibrated through a set of scan parameters for the afocal relay in the second mode to obtain a lateral scan in the second mode to match a lateral location of the region of interest within the first image; a set of reference arm position parameters to obtain an equivalent vertical image location and image plane curvature for image acquisition of the region of interest in the second mode of the afocal relay; and a set of focal control parameters for the second mode to guide a focal plane in an second image mode within the region of interest.

BRIEF DESCRIPTION OF THE SEVERAL VIEWS OF THE DRAWING(S)

FIG. 20 is a flow chart of the operation of the dual mode system.

DETAILED DESCRIPTION OF THE INVENTION

The present disclosure includes a modular optical device that allows users to toggle between a lower lateral resolution, larger field-of-view OCT imaging first mode and a higher lateral resolution, smaller field-of-view OCM imaging second mode that maintains the advantages of each image modality in a single device. The present system is further configured to establish and maintain telecentricity for both a wide depth of field, wide scan range configuration (referred to herein as an OCT (Optical Coherence Tomography) or first mode) and a high numerical aperture, limited scan range configuration (referred to herein as the OCM, (Optical Coherence Microscopy) or second mode). In addition, the present system is configured to provide constant image centration, pathlengths, and parfocality between the first and second modes, such that a user may switch between modes during an active imaging session, allowing a single imaging system to offer the benefits of high numerical aperture and low numerical aperture in one device, and without requiring manipulation of the sample under test. Thus, an active imaging session encompasses the imaging of a given sample under test without having to move the sample between different imaging systems or even changing the illumination of the sample under test while providing imaging in each of the first mode and the second mode.

Figure 1:
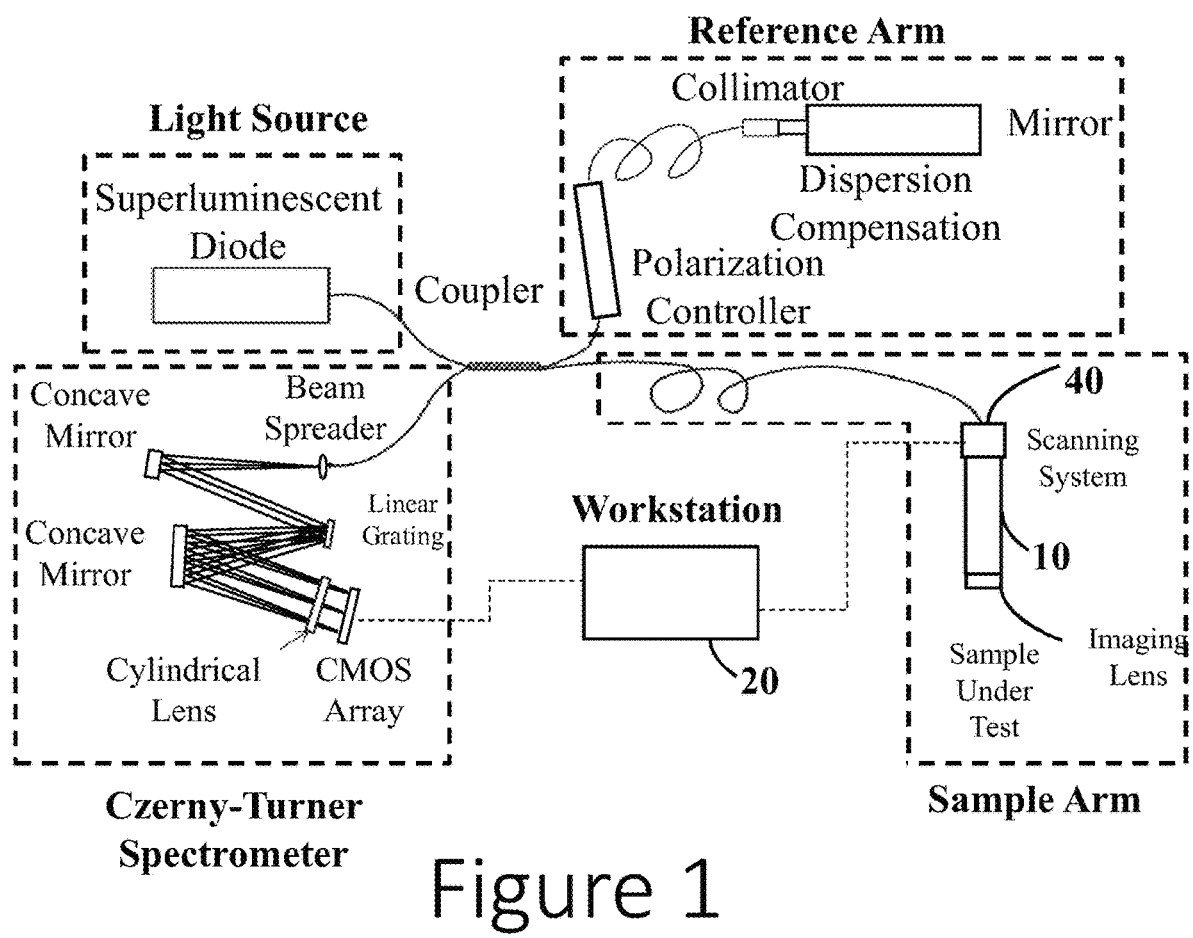
FIG. 1 is a schematic of a representative imaging system incorporating the present system.

Generally, the present system is employed in an imaging system such as the exemplary imaging system of FIG. 1. The system includes a light source, a coupler, a reference arm, a sample arm focusing the light beam into a sample under test, a detection spectrometer, and a data processing engine 20. Light from the light source is first split by the coupler into two paths. One path is the reference arm, that may include a polarization controller, a collimator, a variable neutral density filter, a re-focusing lens, and a reference mirror. The reference mirror and the refocusing lens may be carried on a translational stage for quick adjusting of optical delay. The remaining path is the sample arm, that can include a polarization controller, a collimator, a scanning system 40, such as a 2D scanner pair (that can be Galvo scanners, resonant scanners or micro-electro-mechanical system (MEMS) scanners), an afocal relay 10 and an imaging lens 100 sometimes referred to hereinafter as a final imaging objective 100. The detected spectral interference signal is transferred to and post-processed in the data processing engine 20.

The data processing engine 20 is configured to carry out the steps of the flowchart of FIG. 20. Each block in the flowchart can represent a module, a segment, or a portion of program code, which includes one or more instructions executable by a processor for implementing specific logical functions or steps in the process. The program code may be stored on any type of computer readable medium, for example, data storage including a one or more computer-readable storage media that may be read or accessed by the processor, and may be a fixed or removable hard drive, a flash memory, a rewritable optical disk, a rewritable magnetic tape, or some combination of the above. The computer readable medium may include a physical and/or non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage system. The computer readable medium may be considered a computer readable storage medium, a tangible storage device, or other article of manufacture, for example. Alternatively, program code, instructions, and/or data structures may be transmitted via a wired or wireless communications network.

Figure 2:
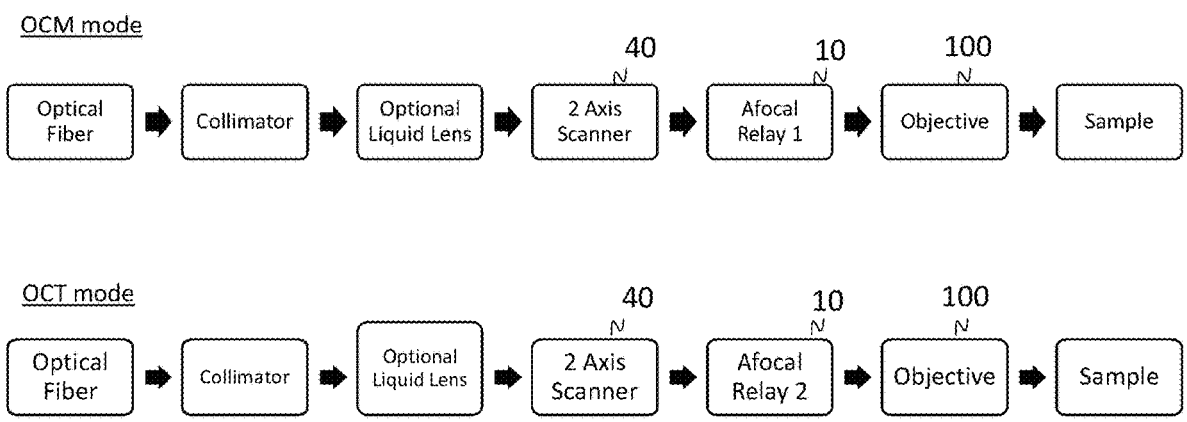
FIG. 2 is a schematic of the system components in the optical coherence microscopy (OCM) mode and an optical coherence tomography (OCT) mode.
Figure 3:
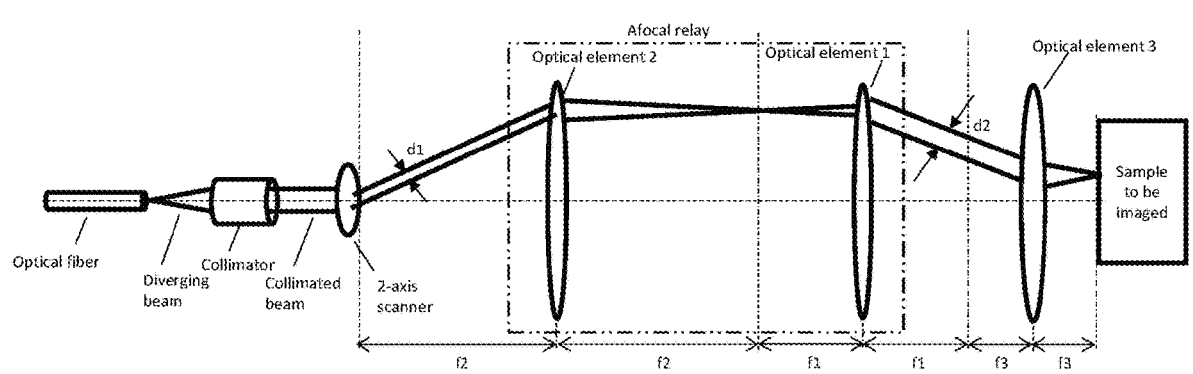
FIG. 3 is a first schematic of the optical elements in a first mode, such as the optical coherence tomography (OCT) mode.
Figure 4:
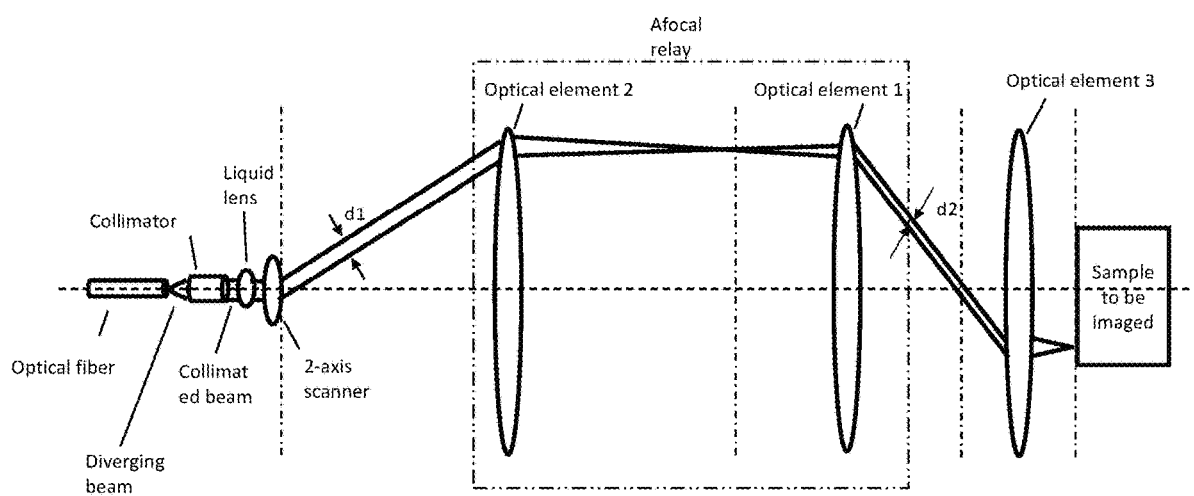
FIG. 4 is a second schematic of the optical elements in a first mode, such as the optical coherence tomography (OCT) mode.

Referring to FIG. 2, the present disclosure employs a magnifying afocal relay 10 with at least two magnification states, or modes, positioned between the scanning system 40, such as but not limited to a two-axis scanning system and a final imaging objective 100. In the first mode, a first magnification of the afocal relay 10 magnifies to a relative lesser degree or demagnifies the beam exiting the entrance pupil of the scanning system 40 (i.e., the scanner clear aperture) such that the beam width at the exit of the distal objective lens is tailored to achieve relatively low numerical aperture scanning of the sample under test; this is the first or OCT mode, shown in FIG. 2. A second magnification of the afocal relay 10 magnifies the beam exiting the entrance pupil of the scanning system (i.e., the scanner clear aperture) such that the beam width at the exit of the distal objective lens is increased to achieve relatively high numerical aperture scanning of the subject; this configuration is the second or OCM mode, shown in FIG. 2.

The afocal relay 10 is an optical system that produces no net convergence or divergence of the beam, i.e., it has infinite focal length. The light entering and exiting the afocal relay 10 is collimated (i.e., focused at infinity). The simplest afocal relay consists of two lenses having focal length $f_1$ and $f_2$, respectively. Afocal relays are characterized by their magnification; in the case of a simple afocal relay consisting only of two elements, the magnification of the afocal relay is given by the ratio between the respective focal lengths.

In one implementation, the afocal relay 10 has an input and an output lens group, where the ratio of the focal lengths of the input and output lens groups defines a beam magnification. When the order of the input lens group and the output lens group is reversed, the magnification of the afocal relay is inverted. Referring to FIGS. 3-6, the low magnification orientations yields imaging in the first or OCT mode, and the high magnification orientation yields imaging in the second or OCM mode. Table 1 lists the relevant optical values associated with the OCM mode and the OCT mode in one specific configuration.

| Variable | units | OCM (GDOCM) | OCT: Flip Afocal Relay |
|---|---|---|---|
| Theta_1 | deg | 13 | 13 |
| d_1 | mm | 3.22 | 3.22 |
| f_1 | mm | 30 | 66 |
| h_1 | mm | 6.93 | 15.24 |
| Mag_1 |  | 2.2 | 0.45 |
| f_2 | mm | 66 | 30 |
| d_2 | mm | 7.1 | 1.5 |
| h_2 | mm | 6.9 | 15.2 |
| Theta_2 | deg | 6.0 | 26.9 |
| Theta_3 | deg | 6.0 | 26.9 |
| f_3 | mm | 20 | 20 |
| d_3 | mm | 7.1 | 1.5 |
| h_3 | mm | 2.1 | 10.2 |
| Path length | cm | 23.2 | 23.2 |
| Relay Clear Aperture | mm | 14 | 31 |
| Scan Range | mm | 4.2 | 20.3 |
| Spot | um | 3.0 | 14.6 |
| DOF | um | 17 | 400 |

Figure 5:
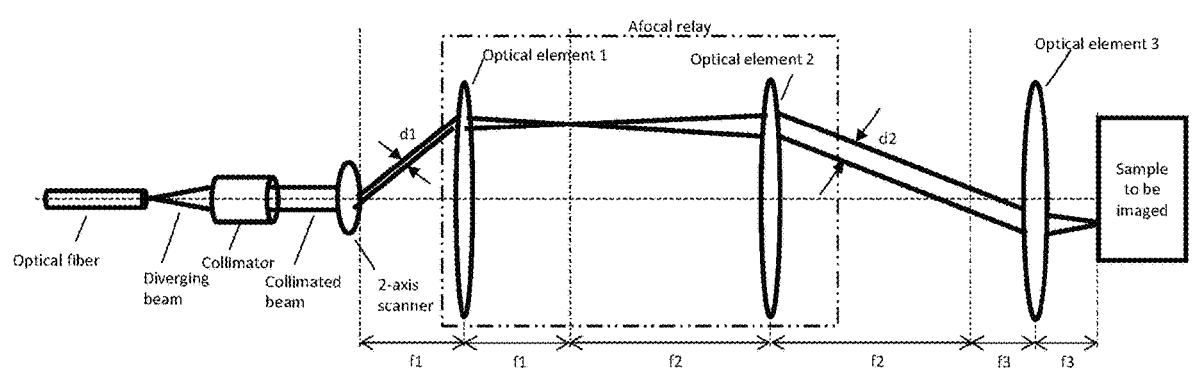
FIG. 5 is a schematic of the optical elements in a second mode, such as the optical coherence microscopy (OCM) mode.
Figure 6:
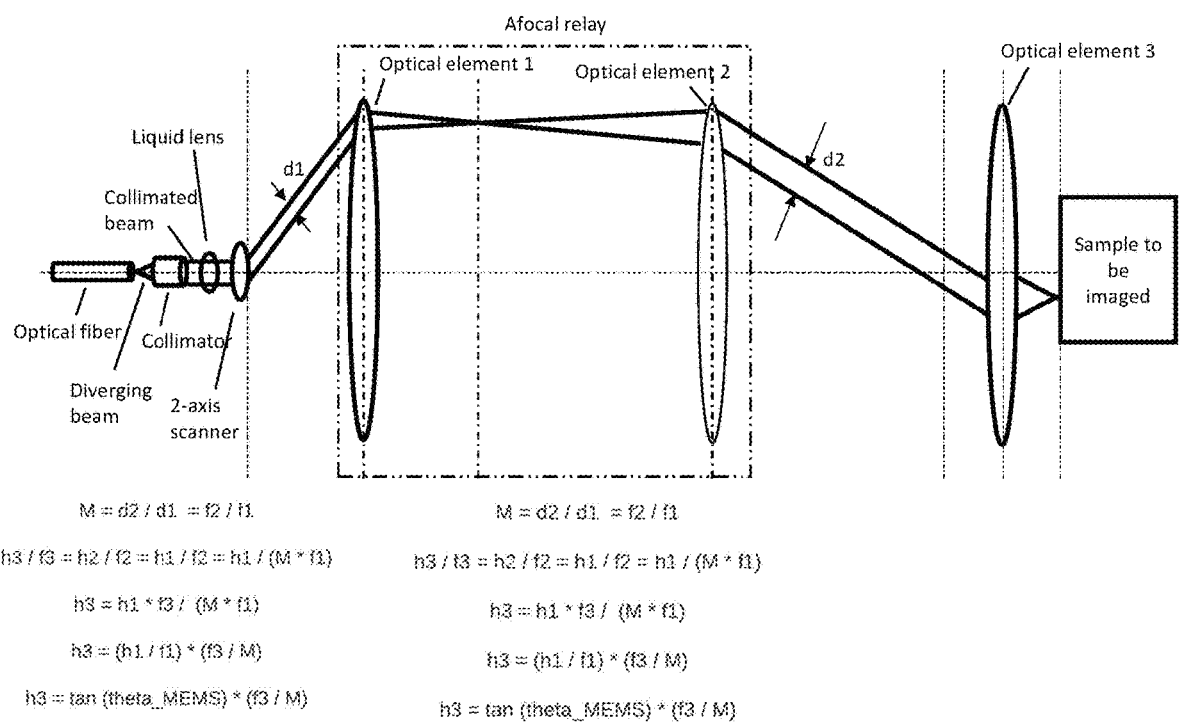
FIG. 6 is a second schematic of the optical elements in the second mode, such as the optical coherence microscopy (OCM) mode.

Specifically, in FIGS. 5 and 6, in the second, OCM, mode:

$$M = \frac{d_2}{d_1} = \frac{f_2}{f_1}$$

$$\frac{h_3}{f_3} = \frac{h_2}{f_2} = \frac{h_1}{f_2} = \frac{h_1}{(M*f_1)}$$

$$h_3 = \frac{h_1 * f_3}{(M*f_1)}$$

$$h_3 = \frac{h_1}{f_1} * \frac{f_3}{M}$$

$$h_3 = \tan\theta * \frac{f_3}{M}$$

In Fig.2-*OCT* mode:

$$M = \frac{d_1}{d_{21}} = \frac{f_1}{f_2}$$

The variables are as follows:

Theta_1: maximum single-sided scan angle, or marginal ray angle from the entrance pupil of the afocal relay;

d_1: effective entrance pupil diameter and input illumination beam diameter dictated by the 2-axis scanning mirror;

f_1: focal length of the input optic (thin lens approximation) of the afocal relay;

h_1=h2: marginal ray height at the input and output of the afocal relay, respectively;

Theta_2=Theta_3: marginal ray angle exiting afocal relay and entering imaging objective, respectively;

d_2=d_3: expanded beam diameter exiting afocal relay and entering imaging objective, respectively;

f_2: focal length of the output optic of the afocal relay f_3: effective back focal length of imaging objective;

h_3: marginal ray height at back principal plane of imaging objective M=Mag_1=M_OCM=f_2/f_1 in OCM mode.

In this exemplary configuration, the OCT mode is enabled by directionally flipping the afocal relay 10, without any other changes. The relative positions of the input focal length and output focal length are switched, and the magnification $$M_{OCT} = \frac{f_1}{f_2} = \frac{1}{M_{OCM}}.$$

In other configurations, the precise parameters of the OCT mode and OCM may be tailored, and the relative magnifications need not be inverses of one another. In one such configuration, the OCT mode is optimized to achieve a useable depth of field balanced against lateral resolution for wide field OCT imaging, and the OCM mode is optimized to maximize the lateral resolution for quasi-isotropic imaging. In this case, the system may include separate afocal relays that may be moved into and out of the optical path between the scanning system 40 and the imaging objective 100. The afocal relays 10 will still be positioned to share a common entrance and exit pupil plane, and will retain substantial parfocality, such as at least within 10 percent. In such a configuration, a physical path length, the geometric length of the path, from scanning system 40 to the imaging objective 100 is held constant, and no motion of the sample under test is required to change imaging between the OCM and the OCT mode. Because the specific lens groups of the separate afocal relays will be different in detail, the optical path lengths will not be precisely equivalent, and parfocality will be slightly affected, such as within a 10 percent variance.

Figure 7:
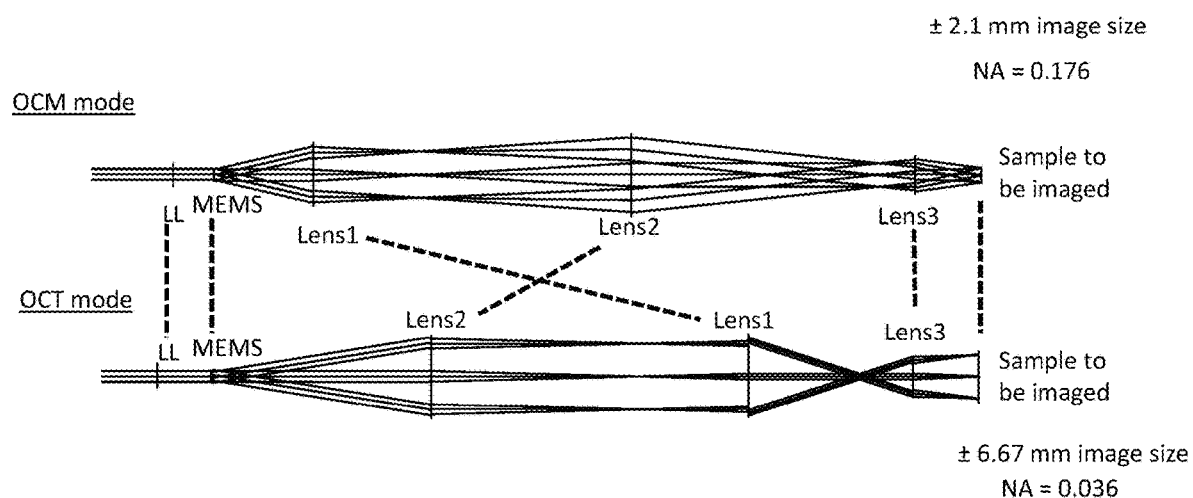
FIG. 7 is a representation of flipping the optical elements between the optical coherence microscopy (OCM) mode and the optical coherence tomography (OCT) mode.

In each of these configurations, and configurations to follow, a focus control element precedes the entrance pupil of the afocal relay, as shown in FIG. 7, and controls the illumination beam divergence (convergence), as the degree of divergence (convergence) controls the precise location of the scanning focal plane.

In one configuration, the focus control element preceding the entrance pupil of the afocal relay is a tuning lens, such as but not limited to an electronically tunable liquid lens, identified as LL in FIG. 7. In a further configuration, the focus control element is a mechanically moveable multi-element lens assembly.

In a further configuration, the tunable lens is optically preceded or optically followed by a bias lens to shift the range of focal powers available to the liquid lens. The bias lens will be positioned proximate the liquid lens (LL) in FIG. 7, for example between LL and MEMS in FIG. 7, or preceding LL in FIG. 7. A power of the bias lens will be determined by the range of available focal powers in the tunable lens.

In one configuration, the liquid lens has a focal adjustment range between −5 D and +15 D. In order to shift the adjustment range for greater balance between positive and negative dioptric powers, a −5 D negative lens is placed proximate the LL, between the LL lens and the MEMS mirror, shifting the effective tunable adjustment range to between −10 D and +10 D.

It is further recognized that in select configurations, the focal plane may be shifted forward (deeper into a sample under test) or backwards (shallower) from the nominal collimated-beam condition by increasing the convergence or divergence of the beam at the entrance pupil, respectively.

In another configuration, the afocal relay 10 includes three lens groups comprising an entrance group, an exit group and an optically intermediate central lens group. In this configuration, the central lens group is translatable along the optical path, such that in a first position, the central group is located proximate the entrance group of the relay, and the optical power at the entrance of the relay is greatest, and in a second position, the central group is located proximate the exit group of the relay and the optical power of the exit group is greatest. In the first position, the afocal relay is magnifying (OCM mode), and in the second position the afocal relay is de-magnifying (OCT mode).

In another configuration, the optical afocal relay 10 of each of the OCM mode and the OCT mode are specified and separately constructed, such that the effective magnification (and demagnification) are engineered to precise targets. In this configuration, the OCM mode and OCT mode afocal relays are configured such that the sum of the focal lengths are equivalent in order to hold the total path length of the system constant. Without such constraint, an imaging head includes an additional adjustment of the optical path between elements.

In this configuration, the lens sets may be configured to be manually replaced or automatically replaced in the optical path using an actuator such as but not limited to an electro-mechanical actuator. The switching time between modes may be on the order of a second, wherein it is anticipated that switching can be initiated by the user or automated following a programmed imaging sequence from the controller.

In the configuration where the afocal relay lens groups are distinct between the two imaging modes, though the focal lengths are held constant, variances in lens geometries may still yield a difference in optical path length, though physical path length is held constant. In this case, a compensator, such as a thin anti-reflection coated compensating plate may be included with the optically shorter of the lens configurations. Alternatively, as the optical path difference is very short and a deterministic property of the afocal relay 10, the path length change may be calibrated and automatically be compensated in the reference arm of the interferometric system during the time it takes for the afocal relays to switch.

In further configurations as seen in FIG. 7, to switch between the OCT and OCM imaging modes, the same afocal relay 10 is flipped with respect to the optical axis.

Figure 8:
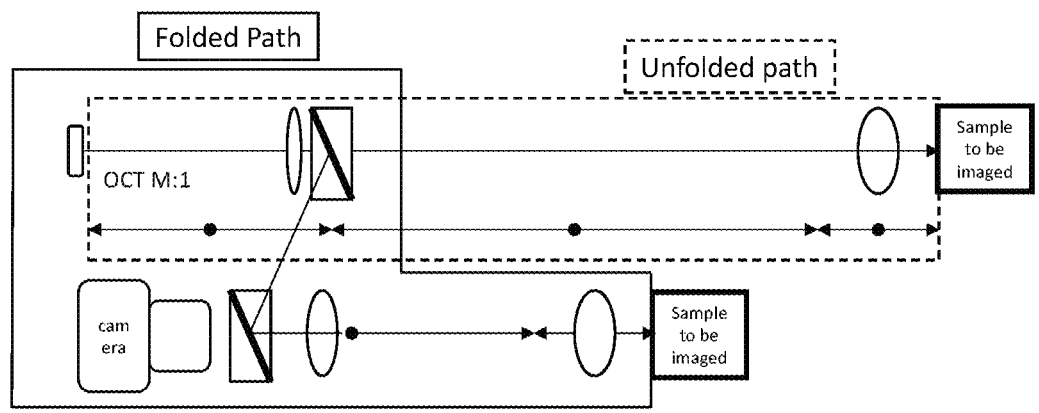
FIG. 8 is a schematic of a folded optical path in the first mode of the afocal relay.

Referring to FIG. 8, in another configuration, the optical path is folded by adding at least one fold mirror in the optical path. In further configurations, a visible light camera is further integrated with the dual OCT/OCM system to visualize the area being imaged, as shown in FIG. 1. The camera is situated on the proximal end of the imaging system, such that the camera shares the field of view and NA of the scanning system.

Figure 9:
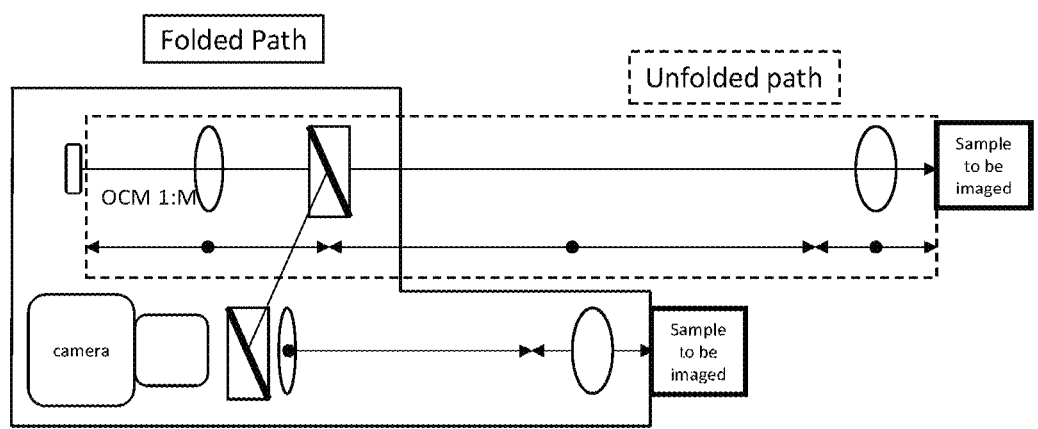
FIG. 9 is a schematic of a folded optical path in the second mode of the afocal relay.
Figure 10:
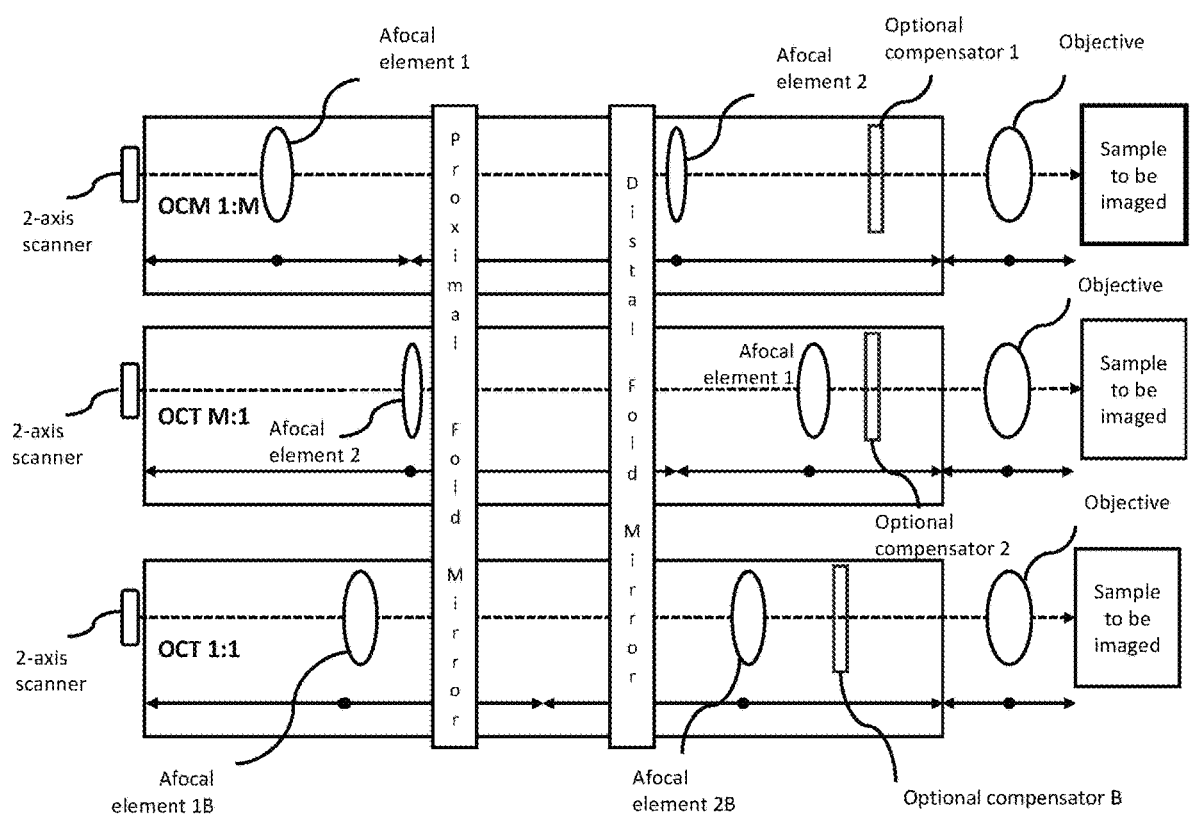
FIG. 10 is a schematic of a folded optical path in the first mode and the second mode.
Figure 11:
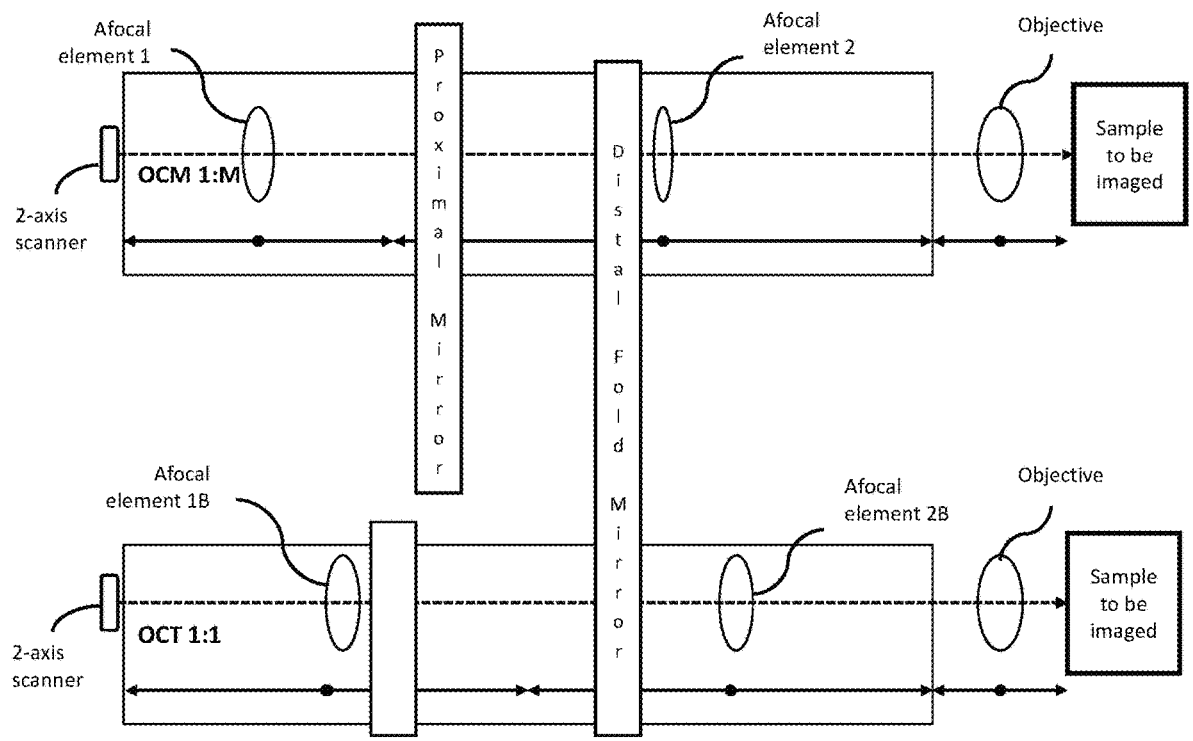
FIG. 11 is a schematic of a folded optical path in the second mode and the first mode.
Figure 12:
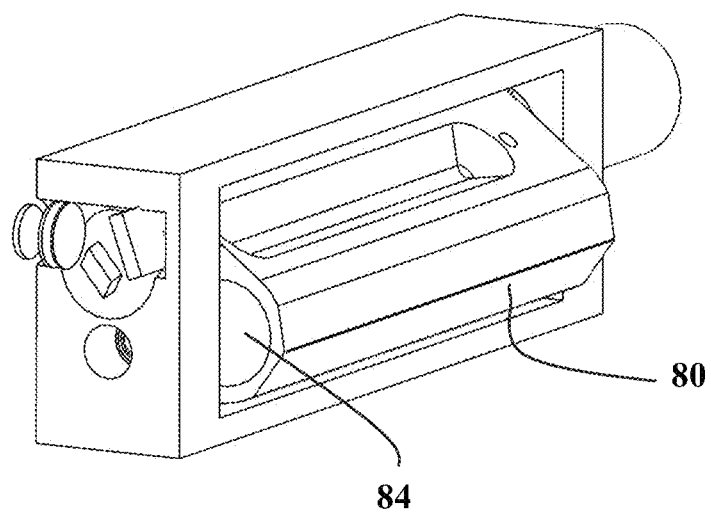
FIG. 12 is a perspective view of a cartridge housing the optics of the first mode and the second mode for selectively optically aligning one of the modes, wherein the first mode is optically aligned.
Figure 13:
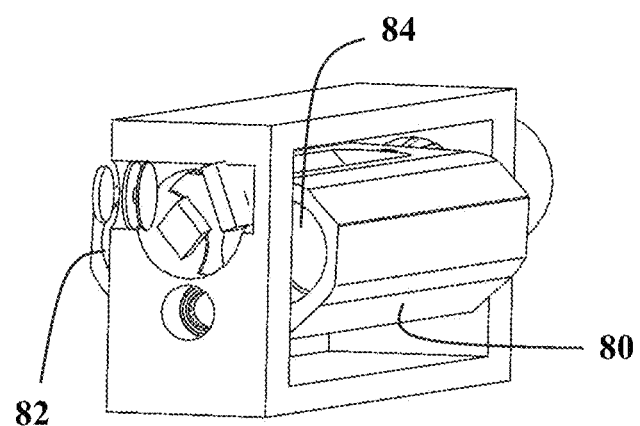
FIG. 13 is a perspective view of the cartridge of FIG. 12, wherein the cartridge is switching between modes.
Figure 14:
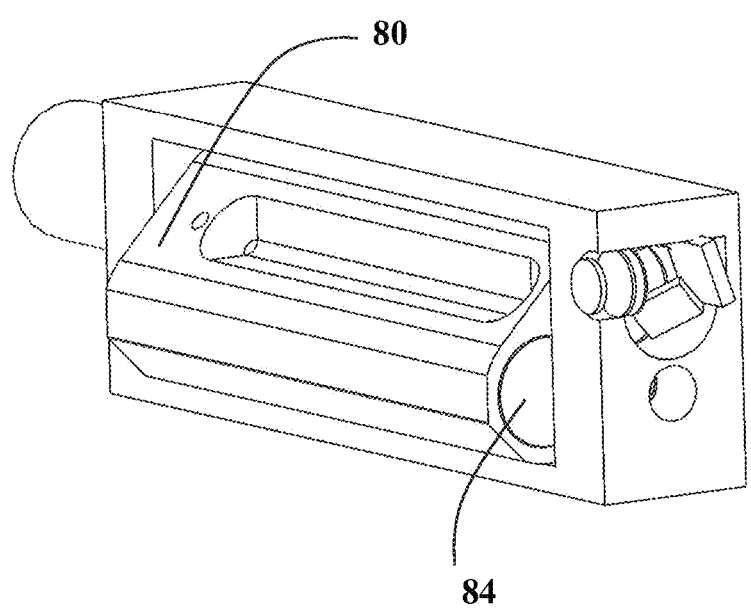
FIG. 14 is a perspective view of the cartridge of FIG. 12, wherein the second mode is optically aligned.
Figure 15:
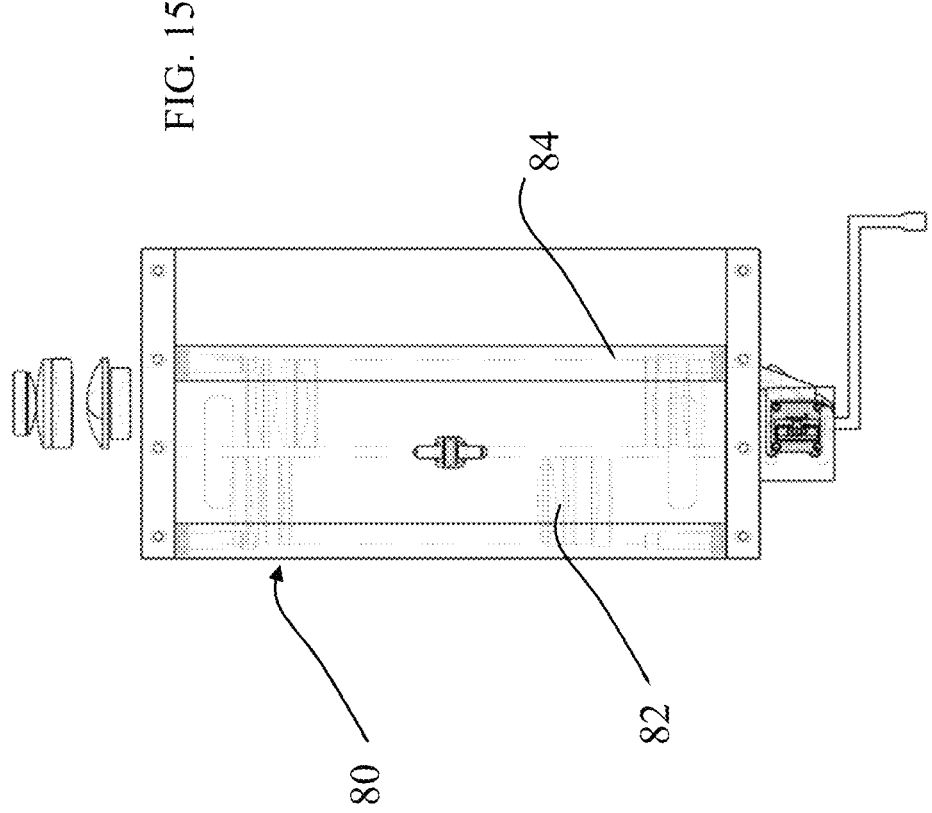
FIG. 15 is a top view of the cartridge of FIG. 17, showing an attached handle for switching the cartridge.

In another configuration, the optical path is folded by adding at least one fold mirror in the optical path. The position of a distal fold mirror is constrained by the position of the OCM distal relay lens. Referring to FIG. 9, the position of the proximal fold mirror is constrained by the position of the OCT proximal relay lens. It is contemplated that the folded configuration can be leveraged for a more compact device. The first, OCT, mode can be obtained by inverting the order of the elements in the OCM afocal relay or by replacing the OCM afocal relay with a different afocal relay, as shown in FIG. 10.

In further configurations, a dynamically focused optical element is embedded in the imaging probe and multiple volumetric images acquired in OCM mode are fused together with Gabor-domain OCM. Such techniques are set forth in U.S. Pat. Nos. 8,184,365; 8,184,367; 8,340,455, each of which is expressly hereby incorporated by reference. The dynamically focused optical element can be a liquid lens (LL). A compensating optic may be used proximate the liquid lens LL in order to optimize the focal range of the system.

In further configurations, fluorescence imaging is further integrated with the dual OCT/OCM system for functional assessment of tissue.

In further configurations, elastography is further integrated with the dual OCT/OCM system for functional assessment of vibro-elastic properties of tissue.

In further configurations, a field flattening optical element is included in the dual OCT/OCM imaging probe to minimize the sag along the image plane.

As set forth above, the dual mode microscope includes an OCT, first mode and an OCM, second mode. In this implementation, the optics for these two modes are designed such that they share the initial and the final optics but differ in the center section. For example, the following objects are established for the construction of the present system:

to be able two change from one mode to the other quickly, easily, accurately, and repeatably;
to have all parts permanently assembled together so that no accessory can be mislaid and lost; and
to be able to read the current mode electronically.

It is contemplated that additional object may include the following:

to minimize volume and mass of the system;
to protect all optics from dust and fingerprints as much as possible; and
to provide tactile feedback corresponding to optics positioning.

While both sliding mechanisms and rotating mechanisms are contemplated for switching between the OCT and the OCM modes, rotating mechanisms may be advantageous as such rotating mechanism can employ commercially available high-precision, yet inexpensive bearings. Two anticipated rotating mechanisms include: (i) rotating about a horizontal axis parallel to the optical axis (roll) and (ii) rotating about a vertical axis (yaw), wherein the vertical axis is perpendicular to the optical axis.

Referring to FIGS. 12-15, and 18-19, an apparatus is shown for rotation (FIGS. 12-14) or linear translation (FIG. 15 and FIGS. 18-19) of the afocal relays between the OCT mode and the OCM mode. FIGS. 12-15 disclose a cartridge 80 for selectively locating barrels bearing the corresponding optics in the optical path, thereby switching between the optics 84 of OCM mode and the optics 82 of the OCT mode.

In one configuration, the OCT mode is at one extreme of travel of the cartridge 80 and the OCM mode is at an opposed extreme of travel of the cartridge. In these Figs., the fixed optics are shown but no provision is shown for their support in the Figs. The cartridge 80 holding the barrels of the OCT and the OCM afocal relays 82, 84 can be machined out of a solid piece of material such as a block of aluminum, wherein bearing seats can be machined into both ends of the block. It is contemplated the bearing seats constrain four degrees of freedom, which for purposes of description as set forth as X, Y, Pitch, and Yaw. The two remaining degrees of freedom are Z (along the optical axis) which can be constrained by a spring-loaded ball bearing, and Roll which is used for changing between the OCT mode and the OCM mode. The four degrees of freedom that these bearings at both ends constrain would require no alignment because each bearing seat would be machined in the same setup with the features that fix the optic locations, so X, Y, Pitch, and Yaw would be accurate to the machining tolerances which can be better than the optical tolerances. The limits of travel at the OCT and OCM ends of travel are contemplated to be magnetically preloaded hard stops. It is further contemplated that such pre-loaded stops can be adjustable to provide for alignment, such as by set screws.

Figure 16:
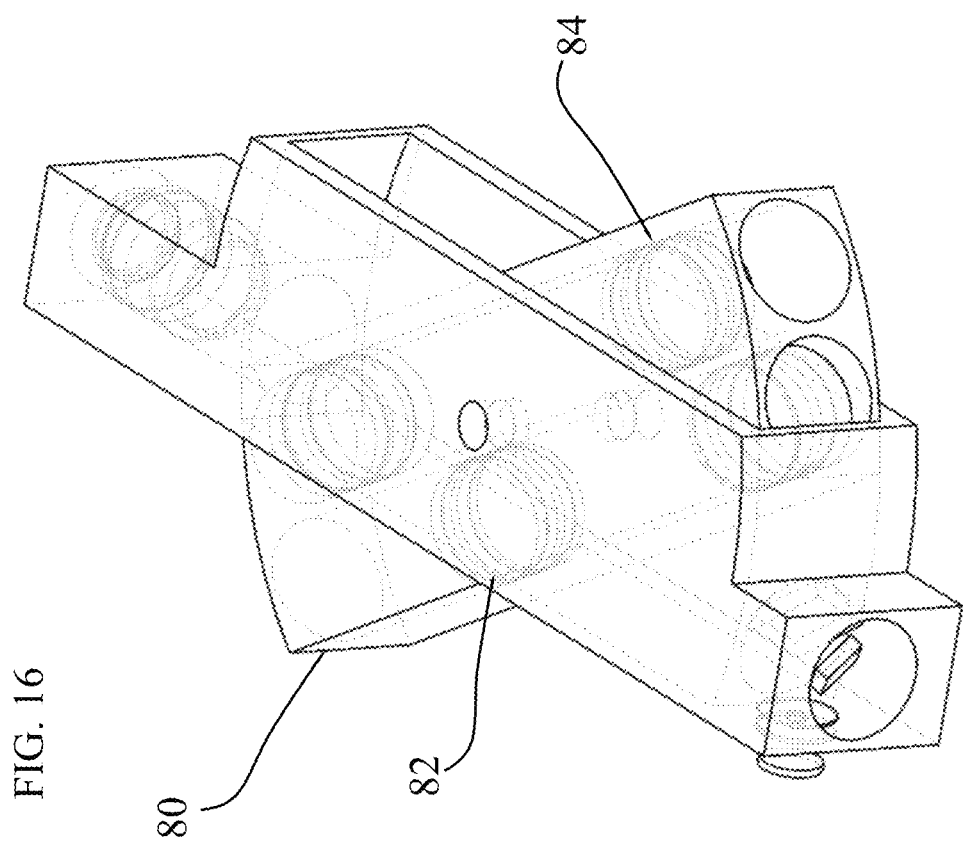
FIG. 16 is a perspective view of an alternative construction of the cartridge for switching the optics between the first mode and the second mode, wherein the cartridge is between the first mode and the second mode.
Figure 17:
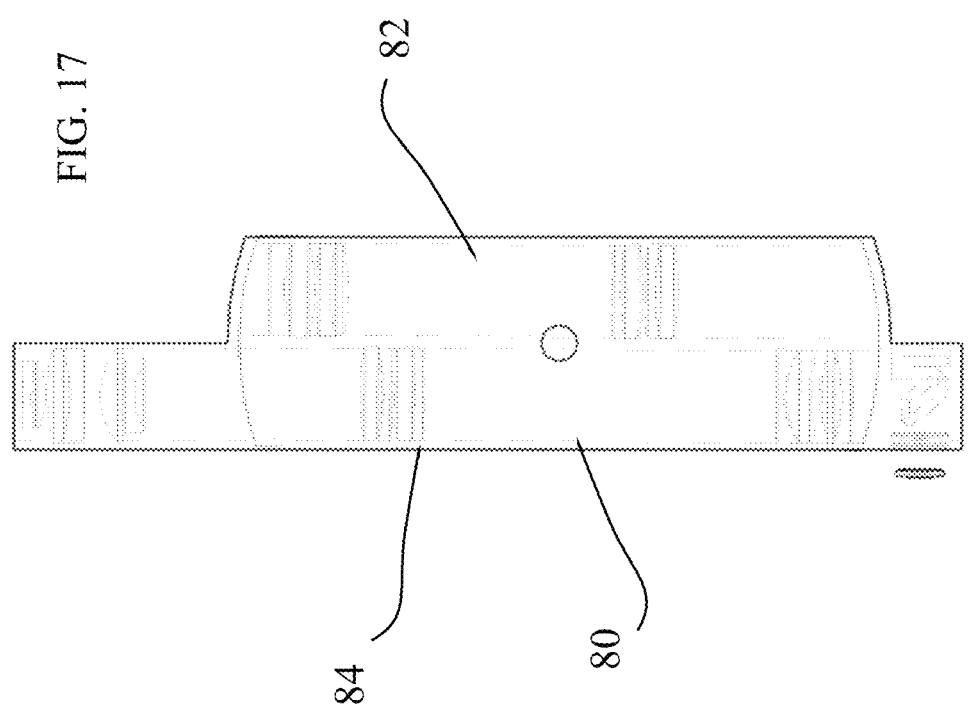
FIG. 17 is a top view of the construction of FIG. 16, showing the first mode being optically aligned.
Figure 18:
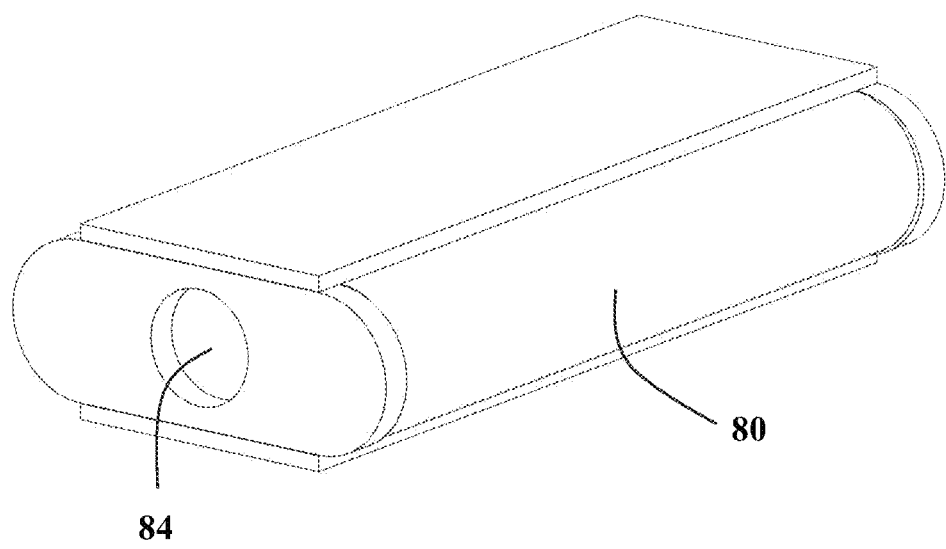
FIG. 18 is a perspective view of an alternative configuration for switching the optics between the first mode and the second mode, wherein the optics are in the first mode.
Figure 19:
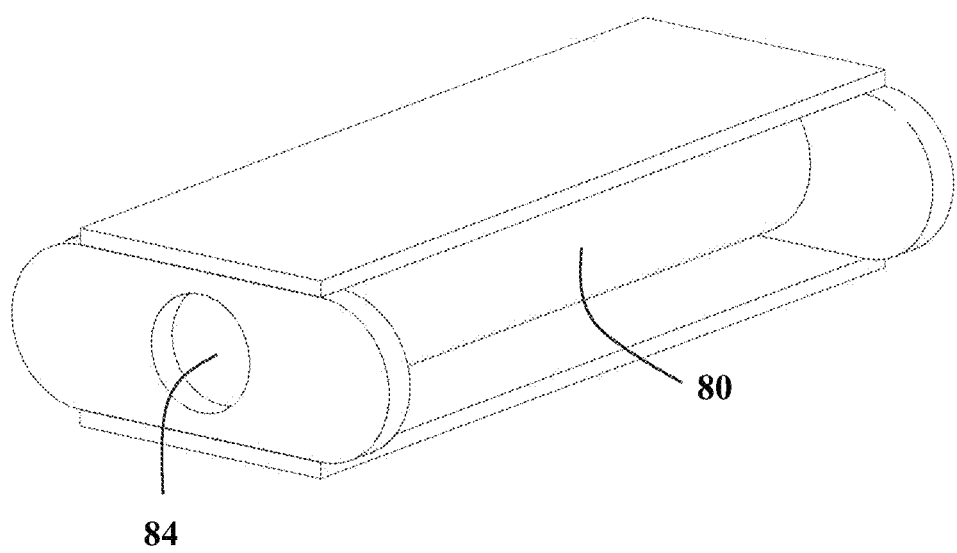
FIG. 19 is a perspective view of the alternative configuration for switching the optics between the first mode and the second mode of FIG. 18, wherein the optics are in the second mode.

In the yaw mechanism, as seen in FIGS. 16 and 17, the optics of the OCM mode and the OCT mode are disposed on a carousel and rotated between being optically intermediate the scanning system and the imagining objective by rotation about an axis perpendicular to the optical path.

FIGS. 16 and 17 show the carousel yawing (spinning) between the OCT mode to the OCM mode, wherein the OCT mode can be at one extreme of travel and the OCM mode at a second extreme of travel of the carousel. As in FIGS. 12-15, the fixed optics are shown but no provision is shown for their support in FIGS. 16 and 17. The carousel holding the OCT and OCM optics can be machined from a solid block such as machined out of a solid block of aluminum and bearing seats can again be machined top and bottom in the center of the part. However, it is contemplated that as these bearing are relatively close together, the bearings may not be adequate to constrain pitch and roll accurately, but would constrain X and Y. Mechanisms at both ends of this part would constrain movement of the carousel accurately at the two extremes of travel. It is further contemplated the limits of travel at the OCT and OCM ends of travel could be magnetically preloaded hard stops, wherein such pre-loaded stops can be adjustable to provide for alignment, such as by set screws.

In comparing these two approaches for switching between the OCM mode and the OCT mode with respect to each of the goals, the following is noted:

With respect to the goal of being able two change from one mode to the other quickly, easily, accurately, and repeatably—both approaches are likely materially the same speed of switching and can be readily implemented. However, it is anticipated that the rolling mechanism may be more accurate as its two support bearings are further separated than the yaw, carousel, configuration, and the seats would be machined in the same machine setups as for the mating optics, thereby enhancing accuracy and repeatability.

With respect to the goal of to have all parts permanently assembled together so that no accessory can be mislaid and lost, both the yaw and rolling mechanisms meet this goal.

With respect to the goal of to being able to read the current mode electronically, it is believed that both mechanisms can be fitted with electronic readouts indicating the selected mode.

With respect to the additional design goals:
(i) Minimize volume and mass of the system. With respect to this goal, both approaches have similar volume and mass, however, it is anticipated the rolling approach may provide a smaller footprint that the yaw, carousel, mechanism.
(ii) Protect the optics from dust and fingerprints. With respect to these goals, each end of the rolling mechanism can be fitted with protective tabs or covers to protect the exposed optics from dust and fingerprints. However, it is anticipated the ends of the optics of the carousel would be temporarily exposed during rotation of the carousel.
(iii) Provide tactile feedback corresponding to the operational location of the rolling mechanism or the yaw mechanism. With respect to this goal, the relatively greater precision of the rolling mechanism, and the need only to preload the cartridge in Z, the magnetically preloaded hard stops can be configured to provide a positive tactile feedback corresponding to location. However, it is contemplated the carousel, or a receiving frame could include magnetically preloaded hard stops that can be configured to provide a positive tactile feedback corresponding to location of the carousel.

One application of the present dual mode system is to survey an extended region of the sample under test in one mode to readily locate a region of interest (which can be embedded within the extended region), and then image the region of interest in a second mode of the system. For example, the present system can be employed to acquire images in the OCT mode to review or survey the extended region of the sample under test to understand the macro structure of the sample under test, and then to acquire an image in the OCM mode of the region of interest, such as an embedded or located region within the extended region of the sample under test to visualize the microstructure of the region of interest, where the region of interest can include a target volume within sample under test.

An advantage of the survey capability is in the imaging of a thick biological tissue sample, where the tissue has multiple layers, such as but not limited to an epidermal layer, a dermal layer, and an endodermal layer. Such a tissue may be skin, or by way of example, cornea. Cornea is constructed of an epithelial anterior layer, stroma, and endothelial posterior layer. Such layered structures are ubiquitous in biological samples; the naming of particular layers may be unique, and layers may be further differentiated according to the sample under test.

It is often important to visualize the cellular structure of a particular layer in the context of the organization of the sample under test. However, it is challenging to visualize the macrostructure of thick biological samples with the same system that is used to image the cellular structure, and further without obtaining physical thin samples from the structure without cutting, for example without the use of a microtome to shave a thin sample from a thick sample. For example, in the case of the cornea, the total thickness may be on the order of 500 micrometers, wherein the epithelium may be $1/10^{th}$ the thickness at 50 micrometers, and wherein the endothelial monolayer may be thinner still at $1/100^{th}$ the thickness, or 5 micrometers.

As the present system is capable of acquiring images in a survey scan, such as a first OCT mode (relative low numerical aperture, relative low lateral resolution, and relative high depth of field) and in a second OCM mode (relative high numerical aperture, relative high lateral resolution, and relative low depth of field) without requiring repositioning of the sample under test, a method is provided to acquire a first survey image or volume in the OCT mode, identify the region of interest, such as a volumetric region of interest, within the first survey image or volume, and acquire a second image of this region of interest (volumetric region of interest) in the OCM mode, without requiring repositioning of the sample under test or a separate portion of the sample under test.

In a specific configuration, an OCT image of a sample under test, such as but not limited to, a donor cornea targeted for surgical transplant is acquired. The OCT image scans an area of 10 mm×10 mm, focused in the middle of the sample with a Rayleigh-range defined depth of field of approximately 400 micrometer. The OCT image is sufficient to visualize and analyze the macrostructure of the cornea from epithelium through endothelium, and confirm the integrity of the stroma and the endothelium, and measure the thickness of the various layers to an accuracy of approximately 1 to 2 micrometers. As a donor tissue, it is important to confirm the viability of the endothelium. The OCM mode is then guided to scan an area of 3 mm×3 mm with a depth of field of approximately 20 micrometers, focused at the endothelium, allowing direct visualization of the endothelial cellular matrix. Therefore, the OCM mode yields not only superior lateral resolution, but in practice superior axial resolution for imaging the target volume, such as the endothelial cellular matrix as well. It is noted that the axial resolution is defined by the bandwidth of the light source, and therefore is substantially equivalent in OCT and OCM modes. The operative word is "substantially," as structural smearing of the image within the focal volume of least confusion slightly reduces the imaging resolution in the OCT mode with respect to imaging in the OCM mode. Thus, "substantially" means that the error in locations is less than or equal to 20%, and in certain configurations less than or equal to 10% of the front focal length of the afocal relay and less than or equal to 20%, and in certain configurations less than or equal to 10% of the back focal length of the imaging objective, respectively.

The relative high numerical aperture of OCM imaging limits the useful depth range of an imaged volume by the narrow depth of field of the OCM beam. Gabor-domain optical coherence microscopy (GDOCM) enables an expanded depth range by acquiring multiple volumes at a sequence of focal settings and applying image processing to stitch the repeated volumes together. In one configuration of the present system, a sample under test is position under the imaging field such that the macrostructure and the microstructure of an extended region and the region of interest are nominally centered within the scan range of the OCM. A first survey volume, an extended region, is acquired in the OCT mode, such that the OCT scan (image) encompasses the maximum scan range of the OCM mode. A second set of OCM images are acquired, substantially centered within the scan window of the OCT by construction, with the focus of OCM volumes sequentially stepped such that a subregion of the OCT scan is replicated at the high lateral resolution of the OCM. In post-processing, the focal-stacked OCM images are stitched, as known in the art, to create a GDOCM image of the sample under test. The OCT image and GDOCM images may be viewed separately, may be viewed synchronously, or the GDOCM image volume and OCT image volume may be further merged to create an image block with the high lateral resolution volume embedded within the high depth of field survey volume. From within the GDOCM image volume, any layer of interest can be visualized and analyzed.

In prior systems, GDOCM acquisition may typically include three to six separate acquisitions with focal adjustments. This is time consuming and requires the allocation of significant computer memory and storage. In one configuration of the present system, the OCT survey image is used to guide the acquisition of the OCM image to specific or target regions of interest, thereby offering significant advantages in imaging speed, memory requirements, and storage, while also accelerating image processing for visualizing the region of interest.

In order to employ the generation of an OCT image of the extended region (or volume) to guide subsequent OCM imaging of a region, or volume, of interest within the extended region, the OCT and OCM modes must be cross-calibrated. In one configuration of the present disclosure, three control variables are available for calibration: (i) scan angle, (ii) reference arm path length, and (iii) focus. Scan angle controls the lateral position of the image beam. Reference arm path length controls the vertical position of the OCx image within the acquired volume. Focus controls the location of the imaging beam waist within the acquired volume.

To the first order, these variables are mutually independent, and each may be calibrated separately. The objective is to calibrate OCM acquisition to optimize lateral resolution and brightness of the region of interest. OCx imaging generally suffers from a degree of image field curvature, analogously to two-dimension imaging. Often, such curvature is either ignored, or may be compensated in post-processing. In the case where a first image modality (OCT) is used to guide a second (OCM), the relative curvatures become important.

In OCx imaging, the lateral plane of the image may have a curvature associated with a variation in the optical path length across the scan range. This scanning curvature may be corrected using passive optics, or in post processing. The scanning curvature may also be compensated using dynamic adjustment of the reference arm path length as a function of scan angle. In principle this works. However, the electro-mechanical reference arm path length control is generally not fast enough for real-time dynamic compensation. In one configuration of the present disclosure, acquisition speed is reduced to allow the reference arm to be dynamically adjusted to obtain a flat imaging plane across the scanned field of view.

In a further configuration of the present disclosure, the field curvature of scanning between the OCT and the OCM scan modes can be matched. In this configuration, the range of adjustment required for achieving equal field curvatures is significantly less than the range of adjustment required for providing a flat imaging field. In this configuration, the reference arm settings of the OCM scan mode are calibrated such that the surface curvature of the OCM mode matches the surface curvature of the OCT image over the same physical scan range. In this configuration, the reference arm setting is fixed in OCT mode, and dynamically adjusted during OCM scanning. In an alternate configuration, the calibration is inverted, and the reference arm settings in OCT mode are dynamically adjusted such that the surface curvature in OCT mode matches that of the OCM mode, when the OCM reference arm position is static or fixed.

In yet a further configuration of the present disclosure, the scan acquisition pattern is adjusted to minimize the curvature of any single cross-sectional scan or reducing the OCT-OCM curvature difference of any single cross-sectional scan, thereby reducing the burden of dynamic reference arm adjustment to a minimum.

The objective of controlling focus in the OCM mode relative to the OCT mode is two-fold. First, the region of interest in the sample under test may itself be curved, as will be for imaging certain samples such as a layer of a cornea. Such curvature is not generally important in high depth of field OCT imaging, but is critical in OCM imaging. Second, the focal plane of the scanning optical system itself is generally curved; such curvature is known as Petzval curvature and is a property of all imaging systems. Petzval curvature may not be important in low numerical aperture OCT imaging, but may be critical in OCM mode.

When imaging a curved object, the Petzval curvature may or may not be in the same direction of as curvature of the object. If one has control of the orientation of the object, orienting the physical curvature to the Petzval curvature can help, but there is no a priori reason that the curvatures will match. Unlike the case of scan plane curvature, there is minimal benefit to matching the OCT Petzval curvature to OCM Petzval curvature. Rather, one configuration of the present disclosure seeks to match the OCM focal plane, including compensation of Petzval curvature, to the OCM region of interest.

In a further configuration of the present disclosure, the focus of the OCM imaging system is dynamically controlled to maximize brightness, and consequently lateral resolution, within the region of interest.

The present disclosure thus provides a method to a) calibrate a set of OCM operating or scan parameters to obtain a lateral scan in the OCM mode to match the lateral location of a region of interest within an OCT image; b) calibrate a set of OCM and/or OCT reference arm position parameters to obtain an equivalent vertical image location and image place curvature for an OCM image acquisition of a region of interest within an OCT image; and c) calibrate a set of OCM focal control parameters to guide a focal plane in an OCM image mode within a target region of interest from within an OCT image volume.

In one configuration of the present disclosure, a set of calibration parameters between an OCT mode and an OCM mode are identified, stored, and available for use in guiding an OCM image acquisition towards a region of interest identified in a previously acquired OCT survey image (scan). A first OCT survey image (scan) is acquired, a region of interest is identified, and an OCM image (scan) is acquired using the calibration parameters to guide at least one of the scan angle, reference arm setting, and focal parameters to optimize the OCM image of the region of interest. The region of interest can be identified manually or through an analysis of the OCT image. In one configuration of the present disclosure, the subject under test to be imaged is a multilayer biological tissue, and the region of interest is an epithelial, stromal or endothelial layer of the tissue (equivalently epidermal, dermal, or endodermal layer).

In a configuration of the present disclosure, the region of interest of the subject under test is identified through one or more image processing methods to identify a surface of the subject under test. Image processing methods known in the art include surface segmentation of the OCT structural image. Layer segmentation includes a serial step of processes including image filtering to reduce noise, detection of an edge in the intensity profile at the boundary between two layers, where a first layer may be the medium above or surrounding the subject under test and the second layer may be the subject under test, identifying a series of such edges that define the surface of the subject, and applying a contour to connect the identified edges into a contiguous representation of the surface. The position of the surface numerically defines the critical boundary of the region of interest, for example from the top of the image frame to the surface. This information may be then be used in the OCM mode to match the boundary of the region of interest in the OCM acquisition to the boundary identified from the OCT image. It is understood there are additional process known in the art that can be employed to identify the region of interest from the OCT image.

In a further configuration of the present disclosure, the subject under test is a cornea, the OCT image covers a scan range between 1.5 mm and 10 mm in diameter, the OCM image covers an embedded region with a scan range between 0.5 mm and 4 mm in diameter, wherein the OCM reference arm is dynamically adjusted such that the surface vertical image position and surface curvature match that of the OCM image at an equivalent lateral position, the OCT image is acquired and the cornea surfaces segmented using image processing techniques, the target region of interest is the cornea endothelium, the boundaries of the endothelium identified from within the OCT image, and the focus of the OCM is controlled in an OCM acquisition to optimize the OCM focus to the corneal endothelium.

It is understood, the sequence above may be altered for other layers of the cornea, other biological tissues, other biological structures with inclusions as regions of interest, other layered structures that are not biological tissues, and other non-biological structures with included regions of interest.

Thus, the present disclosure provides an optical assembly comprising: (a) a scanning system configured to scan a sample with an illuminating beam; (b) an imaging objective; and (c) an afocal relay optically intermediate the scanning system and the imaging objective, the afocal relay configurable between a first (OCM) mode having a first magnification, a first field of view, a first lateral resolution, and a first physical path length and a second mode (OCT) having a lower second magnification, a larger second field of view, a lower second lateral resolution and a second physical path length; wherein the first mode and the second mode are telecentric. It is understood the first physical path length and the second physical path length can be equal in the optical assembly.

In the previous descriptions, it is assumed that the calibrations of scan position, reference arm position, and focus are mutually independent. However, for increasing precision, it is contemplated these variables may be considered at least weakly coupled. Thus, a calibration matrix may be obtained or determined as a linear combination of control parameters.

Thus, the present disclosure provides a method comprising (a) imaging a sample under test with an illumination beam passing through an afocal relay in a first mode, the afocal relay having a first numerical aperture in the first mode; (b) disposing the afocal relay in a second mode having a second numerical aperture, the second numerical being different from the first numerical aperture; and (c) imaging the sample under test with an illumination beam passing through the afocal relay in the second mode. In this method, the first numerical aperture can be greater than the second numerical aperture. Further in this method the first numerical aperture can be less than the second numerical aperture.

The present disclosure also provides a method comprising (a) obtaining a first image of an extended region of a sample under test with an afocal relay in a first mode having a first numerical aperture, a first lateral resolution, and a first depth of field; (b) identifying, in the first image, a region of interest within the extended region; and (c) obtaining a second image of the region of interest with the afocal relay in a second mode having a second numerical aperture greater than the first numerical aperture and a second lateral resolution greater than the first lateral resolution. This method can include the additional step of calibrating obtaining the second image corresponding to at least one of a scan angle, a reference arm path length, and a focus of obtaining the first image. The method can further include the step of at least one of (i) calibrating a set of scan parameters in the second mode to obtain a lateral scan in the second mode to match a lateral location of the region of interest within the first image; (ii) calibrating a set of reference arm position parameters in at least one of the first mode and the second mode to obtain an equivalent vertical image location and image place curvature for obtaining the second image of the region of interest within the OCT image in the second mode; and (iii) calibrating a set of focal control parameters in the second mode to guide a focal plane in the second mode within the region of interest from within the first image from the first mode. The method can also include obtaining the second image without repositioning the sample under test. The additional step of maintaining a fixed position of the sample under test relative to an objective lens between obtaining the first image and obtaining the second image can also be included in the method.

A further method of imaging a sample under test, includes (a) acquiring a first image of an extended region of the sample under test with a configurable afocal relay having a first mode with a first numerical aperture and a second mode having a second numerical aperture, the first numerical aperture being less than the second numerical aperture, the first image acquired in the first mode of afocal relay; (b) identifying a region of interest in the extended region; and (c) acquiring a second image of the region of interest with the afocal relay in the second mode corresponding to a calibration of at least one a scan angle, a reference arm path length, and a focus of at least one of the first mode and the second mode. In this method, the sample under test is in a first position during acquiring the first image and the sample under test is in the first portion during acquiring the second image. This method can include the additional step of changing an acquisition speed to accommodate a change in a reference arm path length. The step of calibrating the reference arm path length in the second mode to match a surface curvature of the first mode for the region of interest can be included. The method can include the additional step of fixing the reference arm path length in the first mode and adjusting the reference arm path length in the second mode.

The disclosure includes a method of imaging a sample under test, including the steps of (a) scanning an extended region of the sample under test with an illumination beam passing through an afocal relay in a first mode having a first numerical aperture and a first path length to generate a first image; (b) identifying a region of interest in the extended region based on the first image; and (c) scanning the region of interest with an illumination beam passing through the afocal relay in a second mode to generate a second image, the second mode having a second numerical aperture and a second path length, wherein the second numerical aperture is greater than the first numerical aperture. The method contemplates the additional step of at least one of (a) calibrating a set of scan parameters for the afocal relay in the second mode to obtain a lateral scan in the second mode to match a lateral location of the region of interest within the first image; (b) calibrating a set of reference arm position parameters to obtain an equivalent vertical image location and image place curvature for image acquisition of the region of interest in the second mode of the afocal relay; and (c) calibrating a set of focal control parameters for the second mode to guide a focal plane in a second image mode within the region of interest.

This disclosure has been described in detail with particular reference to an embodiment, but it will be understood that variations and modifications can be effected within the spirit and scope of the disclosure. The presently disclosed embodiments are therefore considered in all respects to be illustrative and not restrictive.

The invention claimed is:

1. An optical assembly comprising:
   (a) a scanning system having an optical axis configured to scan a sample under test with an illuminating beam;
   (b) an imaging objective; and
   (c) an afocal relay optically intermediate the scanning system and the imaging objective, the afocal relay comprising an entrance pupil located to receive the illumination beam and an exit pupil located substantially at a back focal plane of the imaging objective, the afocal relay configurable between a first mode having a first magnification, a first field of view, a first lateral resolution, and a first physical path length and a second mode having a higher second magnification, a smaller second field of view, a higher second lateral resolution, and a second physical path length, wherein the first mode is an optical coherence tomography (OCT) mode having a first depth of image and the second mode is an optical coherence microscopy (OCM) mode having a second depth of image;
   wherein the afocal relay is configured to maintain (i) the entrance pupil in a first fixed physical location in both the optical coherence tomography (OCT) mode and the optical coherence microscopy (OCM) mode of the afocal relay and (ii) the exit pupil in a second fixed physical location in both the optical coherence tomography (OCT) mode and the optical coherence microscopy (OCM) mode of the afocal relay.

2. The optical assembly of claim 1, wherein a numerical aperture of the first mode is less than a numerical aperture of the second mode.

3. The optical assembly of claim 1, wherein the optical coherence tomography (OCT) mode provides a first depth of image and the optical coherence microscopy (OCM) mode provides a second depth of image, the first depth of image being greater than the second depth of image.

4. The optical assembly of claim 1, wherein telecentricity is maintained between the first mode and the second mode.

5. The optical assembly of claim 1, wherein a sum of focal lengths of the afocal relay in the first mode is the same as a sum of focal lengths of the afocal relay in the second mode.

6. The optical assembly of claim 1, wherein the afocal relay includes an input lens group having a first focal length and an output lens group having different second focal length, wherein the afocal relay in the first mode demagnifies the illumination beam from the entrance pupil to the exit pupil of the afocal relay and the afocal relay in the second mode magnifies the illuminating beam from the entrance pupil to the exit pupil.

7. The optical assembly of claim 1, wherein the afocal relay includes an entrance lens group, an exit lens group, and a central lens group optically intermediate the entrance lens group and the exit lens group, the central lens group being movable between a first position proximate the exit lens group in the first mode and a second position proximate the entrance lens group in the second mode.

8. The optical assembly of claim 1, wherein the afocal relay comprises a first mode set of optical elements and a second mode set of optical elements, the second mode set of optical elements configured to replace the first mode set of optical elements in an optical path intermediate the scanning system and the imaging objective.

9. The optical assembly of claim 8, wherein one of the first physical path length and the second physical path length comprises a compensator.

10. The optical assembly of claim 1, further comprising at least one fold mirror optically intermediate the scanning system and the imaging objective, the at least one fold mirror configured to fold the physical path intermediate the scanning system and the imaging objective.

11. The optical assembly of claim 1, wherein the first physical path length and the second physical path lengths are equal.

12. The optical assembly of claim 1, wherein the afocal relay comprises a first mode set of optical elements fixed in a first barrel and a second mode set of optical elements fixed in a second barrel, wherein the first barrel and the second barrel are located in a movable cartridge configured to selectively locate one of the first barrel and the second barrel in an optical path intermediate the scanning system and the imaging objective.

13. The optical assembly of claim 12, wherein the cartridge rotates about an axis parallel to the optical axis.

14. The optical assembly of claim 12, wherein the cartridge shifts along an axis parallel to the optical axis.

15. An optical assembly comprising:
(a) an afocal relay configurable between a first mode and a second mode, and having an entrance pupil and an exit pupil;
(b) a scanning system comprising a 2-axis scanning mirror located at the entrance pupil of the afocal relay, the scanning system configured to scan a sample under test with an illuminating beam; and
(c) an imaging objective positioned distal to the exit pupil of the afocal relay, wherein the exit pupil of the afocal relay is coincident with an entrance pupil of the imaging objective;
wherein the afocal relay in a first mode provides an optical coherence tomography (OCT) scanning of the sample under test and demagnifies the illuminating beam emergent from the entrance pupil;
wherein the afocal relay in a second mode provides an optical coherence microscopy (OCM) scanning of the sample under test and magnifies the illuminating beam emergent from the entrance pupil; and
wherein the entrance pupil of the afocal relay and the exit pupil of the afocal relay are in the same position in the first mode and the second mode.

16. The optical system of claim 15, wherein the afocal relay in the first mode has a first numerical aperture and the afocal relay in the second mode has a second numerical aperture, the first numerical aperture being less than the second numerical aperture.

17. The optical system of claim 15, wherein telecentricity is maintained between the first mode and the second mode.

18. The optical system of claim 15, wherein the afocal relay comprises a first mode set of optical elements and a second mode set of optical elements, the second mode set of optical elements configured to replace the first mode set of optical elements in an optical path intermediate the scanning system and the imaging objective.

19. The optical system of claim 15, wherein a sum of focal lengths of the afocal relay in the first mode is the same as a sum of focal lengths of the afocal relay in the second mode.

20. The optical system of claim 15, wherein the afocal relay comprises a first mode set of optical elements fixed in a first barrel and a second mode set of optical elements fixed in a second barrel, wherein the first barrel and the second barrel are located in a movable cartridge configured to selectively locate one of the first barrel and the second barrel in an optical path intermediate the scanning system and the imaging objective.

* * * * *